US010644790B2

(12) United States Patent
Ashworth

(10) Patent No.: US 10,644,790 B2
(45) Date of Patent: May 5, 2020

(54) BOOSTER WITH AN INTEGRATED SATELLITE LOCATION SYSTEM MODULE

(71) Applicant: WILSON ELECTRONICS, LLC, St. George, UT (US)

(72) Inventor: Christopher Ken Ashworth, St. George, UT (US)

(73) Assignee: WILSON ELECTRONICS, LLC, St. George, UT (US)

( * ) Notice: Subject to any disclaimer, the term of this patent is extended or adjusted under 35 U.S.C. 154(b) by 70 days.

(21) Appl. No.: 15/709,313

(22) Filed: Sep. 19, 2017

(65) Prior Publication Data

US 2018/0091218 A1 Mar. 29, 2018

Related U.S. Application Data

(60) Provisional application No. 62/399,066, filed on Sep. 23, 2016.

(51) Int. Cl.
| | | |
|---|---|---|
| H04B 7/185 | (2006.01) | |
| H04B 7/155 | (2006.01) | |
| H04W 84/04 | (2009.01) | |
| H04W 84/06 | (2009.01) | |
| H04W 88/02 | (2009.01) | |
| H04W 88/08 | (2009.01) | |

(52) U.S. Cl.
CPC ..... H04B 7/18565 (2013.01); H04B 7/15535 (2013.01); H04B 7/18517 (2013.01); H04W 84/042 (2013.01); H04W 84/06 (2013.01); H04W 88/02 (2013.01); H04W 88/08 (2013.01)

(58) Field of Classification Search
CPC ........... H04B 7/18565; H04B 7/18517; H04W 84/042; H04W 84/06; H04W 88/02; H04W 88/08
See application file for complete search history.

(56) References Cited

U.S. PATENT DOCUMENTS

| | | | |
|---|---|---|---|
| 4,776,032 | A | 10/1988 | Odate |
| 5,303,395 | A | 4/1994 | Dayani |
| 5,737,687 | A | 4/1998 | Martin |
| 5,777,530 | A | 7/1998 | Nakatuka |
| 5,835,848 | A | 11/1998 | Bi |
| 6,005,884 | A | 12/1999 | Cook |
| 6,711,388 | B1 | 3/2004 | Jukka-Pekka |

(Continued)

FOREIGN PATENT DOCUMENTS

EP 1525678 7/2008

OTHER PUBLICATIONS

PCT Application No. PCT/US2017/052331 Filing Date Sep. 19, 2017, Christopher Ken Ashworth, International Search Report, dated Jan. 30, 2018, 12 Pages.

*Primary Examiner* — Kevin D Mew
(74) *Attorney, Agent, or Firm* — Thorpe North & Western

(57) ABSTRACT

Technology for a cellular signal booster with a satellite location system signal rebroadcast functionality is disclosed. The cellular signal booster can identify a satellite location system signal received via a satellite location system module of the cellular signal booster. The cellular signal booster can provide the satellite location system signal to a signal path for amplification of the satellite location system signal. The cellular signal booster can broadcast an amplified satellite location system signal to a mobile device within a defined distance from the cellular signal booster.

21 Claims, 7 Drawing Sheets

(56) References Cited

U.S. PATENT DOCUMENTS

| | | |
|---|---|---|
| 6,889,033 B2 | 5/2005 | Bongfeldt |
| 6,990,313 B1 | 1/2006 | Yarkosky |
| 7,035,587 B1 | 4/2006 | Yarkosky |
| 7,221,967 B2 | 5/2007 | Van Buren |
| 7,974,573 B2 | 7/2011 | Dean |
| 8,090,132 B2 * | 1/2012 | Tang ................. H04M 1/05 381/361 |
| 8,432,808 B1 * | 4/2013 | Dankberg ............ H04W 4/06 370/235 |
| 8,760,241 B1 * | 6/2014 | Ashworth ............ H01P 1/213 333/126 |
| 9,054,664 B1 * | 6/2015 | Ashworth ........... H03G 3/3042 |
| 9,881,506 B1 * | 1/2018 | Gentry ................. G08G 5/0069 |
| 2001/0054060 A1 * | 12/2001 | Fillebrown ........... G06F 1/1626 709/201 |
| 2002/0044594 A1 | 4/2002 | Bongfeldt |
| 2002/0056114 A1 * | 5/2002 | Fillebrown ........... G06F 1/1626 725/78 |
| 2003/0123401 A1 | 7/2003 | Dean |
| 2004/0137854 A1 | 6/2004 | Ge |
| 2004/0146013 A1 | 7/2004 | Song |
| 2004/0166802 A1 | 8/2004 | McKay |
| 2004/0219876 A1 | 11/2004 | Baker |
| 2004/0235417 A1 | 11/2004 | Dean |
| 2005/0118949 A1 | 6/2005 | Allen |
| 2005/0208889 A1 * | 9/2005 | Baker ................. H04B 7/155 455/7 |
| 2005/0272367 A1 | 12/2005 | Rodgers et al. |
| 2006/0084379 A1 | 4/2006 | O'Neill |
| 2007/0071128 A1 | 4/2007 | Meir |
| 2007/0076645 A1 * | 4/2007 | VanDrunen .......... G08C 17/02 370/315 |
| 2007/0188235 A1 | 8/2007 | Dean |
| 2007/0216573 A1 * | 9/2007 | Handermann ........ G01S 5/0027 342/357.22 |
| 2007/0298786 A1 * | 12/2007 | Meyers ............... G01S 5/0027 455/431 |
| 2008/0081555 A1 | 4/2008 | Kong |
| 2008/0096483 A1 | 4/2008 | Van Buren |
| 2008/0278237 A1 | 11/2008 | Kang |
| 2010/0056142 A1 * | 3/2010 | Ricci .................. H04W 84/042 455/435.1 |
| 2010/0171654 A1 * | 7/2010 | Millard ................ G01S 19/03 342/357.52 |
| 2010/0311480 A1 * | 12/2010 | Raines ................ G01S 19/03 455/575.7 |
| 2011/0028088 A1 | 2/2011 | Avellan et al. |
| 2012/0068886 A1 * | 3/2012 | Torres ................ G01S 19/34 342/357.74 |
| 2013/0343264 A1 | 12/2013 | Zellner et al. |
| 2014/0050253 A1 * | 2/2014 | Jovanovic ........... H04L 27/26 375/211 |
| 2014/0266424 A1 | 9/2014 | Ashworth et al. |
| 2015/0029909 A1 * | 1/2015 | Ashworth .......... H04B 7/15535 370/279 |
| 2016/0036403 A1 * | 2/2016 | Ashworth ........... H03G 3/3042 330/284 |
| 2016/0095002 A1 * | 3/2016 | Zhan ................. H04B 7/15557 370/294 |
| 2016/0269132 A1 * | 9/2016 | Clark ................. H04W 16/28 |
| 2017/0055231 A1 * | 2/2017 | Cook .................. H04W 52/0229 |
| 2017/0093807 A1 * | 3/2017 | Gross ................. H04B 3/52 |
| 2017/0111161 A1 * | 4/2017 | Raggio ............... H04L 5/005 |
| 2017/0354048 A1 * | 12/2017 | Harshbarger ....... H04W 4/70 |
| 2018/0139627 A1 * | 5/2018 | Ashworth ........... H04B 7/026 |
| 2018/0241109 A1 * | 8/2018 | Ashworth ........... H04B 1/00 |
| 2018/0248676 A1 * | 8/2018 | Raggio ............... H04L 5/14 |
| 2018/0287690 A1 * | 10/2018 | Ashworth .......... H04B 7/15535 |
| 2018/0295672 A1 * | 10/2018 | Ashworth ........... H04W 88/04 |

* cited by examiner

BOOSTER WITH AN INTEGRATED SATELLITE LOCATION SYSTEM MODULE

RELATED APPLICATIONS

The present application claims priority to U.S. Provisional Patent Application No. 62/399,066, filed Sep. 23, 2016, the entire specification of which is hereby incorporated by reference in its entirety for all purposes.

BACKGROUND

Signal boosters can be used to increase the quality of wireless communication between a wireless device and a wireless communication access point, such as a cell tower. Signal boosters can improve the quality of the wireless communication by amplifying, filtering, and/or applying other processing techniques to uplink and downlink signals communicated between the wireless device and the wireless communication access point.

As an example, the signal booster can receive, via an antenna, downlink signals from the wireless communication access point. The signal booster can amplify the downlink signal and then provide an amplified downlink signal to the wireless device. In other words, the signal booster can act as a relay between the wireless device and the wireless communication access point. As a result, the wireless device can receive a stronger signal from the wireless communication access point. Similarly, uplink signals from the wireless device (e.g., telephone calls and other data) can be directed to the signal booster. The signal booster can amplify the uplink signals before communicating, via the antenna, the uplink signals to the wireless communication access point.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
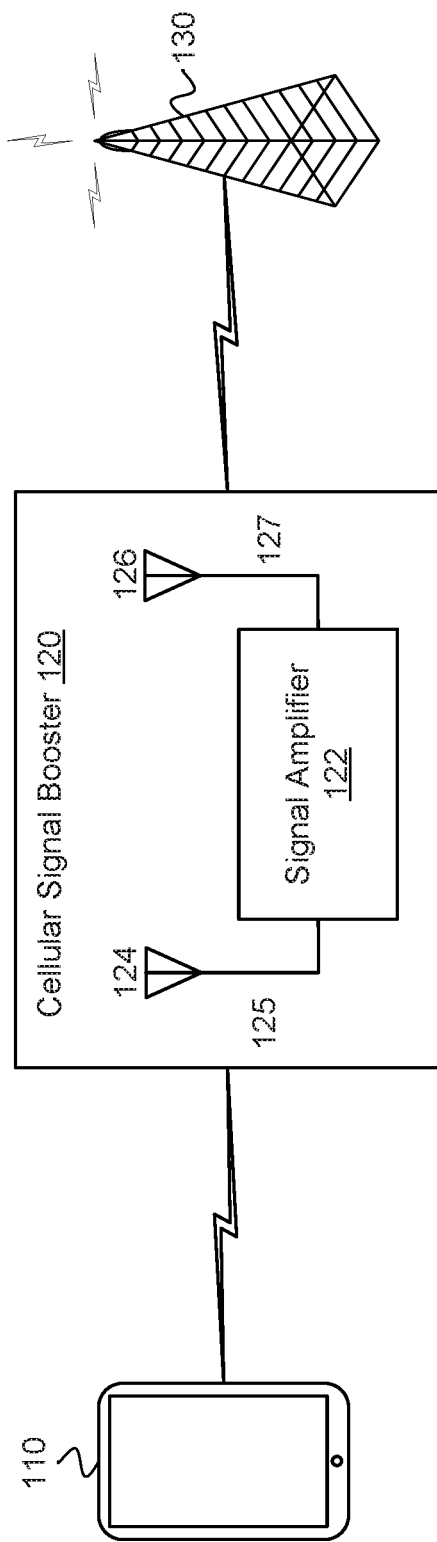
FIG. 1 illustrates a signal booster in communication with a wireless device and a base station in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

FIG. 1 illustrates an exemplary signal booster 120 in communication with a wireless device 110 and a base station 130. The signal booster 120 can be referred to as a repeater. A repeater can be an electronic device used to amplify (or boost) signals. The signal booster 120 (also referred to as a cellular signal amplifier) can improve the quality of wireless communication by amplifying, filtering, and/or applying other processing techniques via a signal amplifier 122 to uplink signals communicated from the wireless device 110 to the base station 130 and/or downlink signals communicated from the base station 130 to the wireless device 110. In other words, the signal booster 120 can amplify or boost uplink signals and/or downlink signals bi-directionally. In one example, the signal booster 120 can be at a fixed location, such as in a home or office. Alternatively, the signal booster 120 can be attached to a mobile object, such as a vehicle or a wireless device 110.

In one configuration, the signal booster 120 can include an integrated device antenna 124 (e.g., an inside antenna or a coupling antenna) and an integrated node antenna 126 (e.g., an outside antenna). The integrated node antenna 126 can receive the downlink signal from the base station 130. The downlink signal can be provided to the signal amplifier 122 via a second coaxial cable 127 or other type of radio frequency connection operable to communicate radio frequency signals. The signal amplifier 122 can include one or more cellular signal amplifiers for amplification and filtering. The downlink signal that has been amplified and filtered can be provided to the integrated device antenna 124 via a first coaxial cable 125 or other type of radio frequency connection operable to communicate radio frequency signals. The integrated device antenna 124 can wirelessly communicate the downlink signal that has been amplified and filtered to the wireless device 110.

Similarly, the integrated device antenna 124 can receive an uplink signal from the wireless device 110. The uplink signal can be provided to the signal amplifier 122 via the first coaxial cable 125 or other type of radio frequency connection operable to communicate radio frequency signals. The signal amplifier 122 can include one or more cellular signal amplifiers for amplification and filtering. The uplink signal that has been amplified and filtered can be provided to the integrated node antenna 126 via the second coaxial cable 127 or other type of radio frequency connection operable to communicate radio frequency signals. The integrated device antenna 126 can communicate the uplink signal that has been amplified and filtered to the base station 130.

In one example, the signal booster 120 can filter the uplink and downlink signals using any suitable analog or digital filtering technology including, but not limited to, surface acoustic wave (SAW) filters, bulk acoustic wave (BAW) filters, film bulk acoustic resonator (FBAR) filters, ceramic filters, waveguide filters or low-temperature co-fired ceramic (LTCC) filters.

In one example, the signal booster 120 can send uplink signals to a node and/or receive downlink signals from the node. The node can comprise a wireless wide area network (WWAN) access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or another type of WWAN access point.

In one configuration, the signal booster 120 used to amplify the uplink and/or a downlink signal is a handheld booster. The handheld booster can be implemented in a sleeve of the wireless device 110. The wireless device sleeve can be attached to the wireless device 110, but can be removed as needed. In this configuration, the signal booster 120 can automatically power down or cease amplification when the wireless device 110 approaches a particular base station. In other words, the signal booster 120 can determine to stop performing signal amplification when the quality of uplink and/or downlink signals is above a defined threshold based on a location of the wireless device 110 in relation to the base station 130.

In one example, the signal booster 120 can include a battery to provide power to various components, such as the signal amplifier 122, the integrated device antenna 124 and the integrated node antenna 126. The battery can also power the wireless device 110 (e.g., phone or tablet). Alternatively, the signal booster 120 can receive power from the wireless device 110.

In one configuration, the signal booster 120 can be a Federal Communications Commission (FCC)-compatible consumer signal booster. As a non-limiting example, the signal booster 120 can be compatible with FCC Part 20 or 47 Code of Federal Regulations (C.F.R.) Part 20.21 (Mar. 21, 2013). In addition, the signal booster 120 can operate on the frequencies used for the provision of subscriber-based services under parts 22 (Cellular), 24 (Broadband PCS), 27 (AWS-1, 700 MHz Lower A-E Blocks, and 700 MHz Upper C Block), and 90 (Specialized Mobile Radio) of 47 C.F.R. The signal booster 120 can be configured to automatically self-monitor its operation to ensure compliance with applicable noise and gain limits. The signal booster 120 can either self-correct or shut down automatically if the signal booster's operations violate the regulations defined in FCC Part 20.21.

In one configuration, the signal booster 120 can improve the wireless connection between the wireless device 110 and the base station 130 (e.g., cell tower) or another type of wireless wide area network (WWAN) access point (AP). The signal booster 120 can boost signals for cellular standards, such as the Third Generation Partnership Project (3GPP) Long Term Evolution (LTE) Release 8, 9, 10, 11, 12, or 13 standards or Institute of Electronics and Electrical Engineers (IEEE) 802.16. In one configuration, the signal booster 120 can boost signals for 3GPP LTE Release 13.0.0 (March 2016) or other desired releases. The signal booster 120 can boost signals from the 3GPP Technical Specification 36.101 (Release 12 Jun. 2015) bands or LTE frequency bands. For example, the signal booster 120 can boost signals from the LTE frequency bands: 2, 4, 5, 12, 13, 17, and 25. In addition, the signal booster 120 can boost selected frequency bands based on the country or region in which the signal booster is used, including any of bands 1-70 or other bands, as disclosed in ETSI TS136 104 V13.5.0 (2016-10).

The number of LTE frequency bands and the level of signal improvement can vary based on a particular wireless device, cellular node, or location. Additional domestic and international frequencies can also be included to offer increased functionality. Selected models of the signal booster 120 can be configured to operate with selected frequency bands based on the location of use. In another example, the signal booster 120 can automatically sense from the wireless device 110 or base station 130 (or GPS, etc.) which frequencies are used, which can be a benefit for international travelers.

In one example, the integrated device antenna 124 and the integrated node antenna 126 can be comprised of a single antenna, an antenna array, or have a telescoping form-factor. In another example, the integrated device antenna 124 and the integrated node antenna 126 can be a microchip antenna. An example of a microchip antenna is AMMAL001. In yet another example, the integrated device antenna 124 and the integrated node antenna 126 can be a printed circuit board (PCB) antenna. An example of a PCB antenna is TE 2118310-1.

In one example, the integrated device antenna 124 can receive uplink (UL) signals from the wireless device 100 and transmit DL signals to the wireless device 100 using a single antenna. Alternatively, the integrated device antenna 124 can receive UL signals from the wireless device 100 using a dedicated UL antenna, and the integrated device antenna 124 can transmit DL signals to the wireless device 100 using a dedicated DL antenna.

In one example, the integrated device antenna 124 can communicate with the wireless device 110 using near field communication. Alternatively, the integrated device antenna 124 can communicate with the wireless device 110 using far field communication.

In one example, the integrated node antenna 126 can receive downlink (DL) signals from the base station 130 and transmit uplink (UL) signals to the base station 130 via a single antenna. Alternatively, the integrated node antenna 126 can receive DL signals from the base station 130 using a dedicated DL antenna, and the integrated node antenna 126 can transmit UL signals to the base station 130 using a dedicated UL antenna.

In one configuration, multiple signal boosters can be used to amplify UL and DL signals. For example, a first signal booster can be used to amplify UL signals and a second signal booster can be used to amplify DL signals. In addition, different signal boosters can be used to amplify different frequency ranges.

In one configuration, the signal booster 120 can be configured to identify when the wireless device 110 receives a relatively strong downlink signal. An example of a strong downlink signal can be a downlink signal with a signal strength greater than approximately −80 dBm. The signal booster 120 can be configured to automatically turn off selected features, such as amplification, to conserve battery life. When the signal booster 120 senses that the wireless device 110 is receiving a relatively weak downlink signal, the integrated booster can be configured to provide amplification of the downlink signal. An example of a weak downlink signal can be a downlink signal with a signal strength less than −80 dBm.

In one example, the signal booster 120 can also include one or more of: a waterproof casing, a shock absorbent casing, a flip-cover, a wallet, or extra memory storage for the wireless device. In one example, extra memory storage can be achieved with a direct connection between the signal booster 120 and the wireless device 110. In another example, Near-Field Communications (NFC), Bluetooth v4.0, Bluetooth Low Energy, Bluetooth v4.1, Bluetooth v4.2, Bluetooth 5, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, or IEEE 802.11ad can be used to couple the signal booster 120 with the wireless device 110 to enable data from the wireless device 110 to be communicated to and stored in the extra memory storage that is integrated in the signal booster 120. Alternatively, a connector can be used to connect the wireless device 110 to the extra memory storage.

In one example, the signal booster 120 can include photovoltaic cells or solar panels as a technique of charging the integrated battery and/or a battery of the wireless device 110. In another example, the signal booster 120 can be configured to communicate directly with other wireless devices with signal boosters. In one example, the integrated node antenna 126 can communicate over Very High Frequency (VHF) communications directly with integrated node antennas of other signal boosters. The signal booster 120 can be configured to communicate with the wireless device 110 through a direct connection, Near-Field Communications (NFC), Bluetooth v4.0, Bluetooth Low Energy, Bluetooth v4.1, Bluetooth v4.2, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, IEEE 802.11ad, a TV White Space Band (TVWS), or any other industrial, scientific and medical (ISM) radio band. Examples of such ISM bands include 2.4 GHz, 3.6 GHz, 4.9 GHz, 5 GHz, or 5.9 GHz. This configuration can allow data to pass at high rates between multiple wireless devices with signal boosters. This configuration can also allow users to send text messages, initiate phone calls, and engage in video communications between wireless devices with signal boosters. In one example, the integrated node antenna 126 can be configured to couple to the wireless device 110. In other words, communications between the integrated node antenna 126 and the wireless device 110 can bypass the integrated booster.

In another example, a separate VHF node antenna can be configured to communicate over VHF communications directly with separate VHF node antennas of other signal boosters. This configuration can allow the integrated node antenna 126 to be used for simultaneous cellular communications. The separate VHF node antenna can be configured to communicate with the wireless device 110 through a direct connection, Near-Field Communications (NFC), Bluetooth v4.0, Bluetooth Low Energy, Bluetooth v4.1, Bluetooth v4.2, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, IEEE 802.11ad, a TV White Space Band (TVWS), or any other industrial, scientific and medical (ISM) radio band.

In one configuration, the signal booster 120 can be configured for satellite communication. In one example, the integrated node antenna 126 can be configured to act as a satellite communication antenna. In another example, a separate node antenna can be used for satellite communications. The signal booster 120 can extend the range of coverage of the wireless device 110 configured for satellite communication. The integrated node antenna 126 can receive downlink signals from satellite communications for the wireless device 110. The signal booster 120 can filter and amplify the downlink signals from the satellite communication. In another example, during satellite communications, the wireless device 110 can be configured to couple to the signal booster 120 via a direct connection or an ISM radio band. Examples of such ISM bands include 2.4 GHz, 3.6 GHz, 4.9 GHz, 5 GHz, or 5.9 GHz.

In existing solutions, standalone global positioning system (GPS) repeaters, also known as GPS re-radiators), can be used to amplify GPS signals. The GPS repeater can be installed in an indoor space in which GPS signals are typically not reachable (or weak). Non-limiting examples of such an indoor space can include workshops, tunnels, mines, fire stations, police stations, buildings, hangars, etc. The GPS repeater can operate in the L1 band and the L2 band. The GPS repeater can include one or more GPS antennas that receive GPS signals from one or more GPS satellites. The GPS repeater can receive the GPS signals in a downlink. The GPS signals can include positioning and timing signals. The GPS repeater can amplify the GPS signals, and then forward amplified GPS signals to a device in proximity or within the indoor space. As a result, the device can utilize the amplified GPS signals for location determination, etc. Without the GPS repeater, the device within the indoor space may be unable to detect the GPS signals or a quality of the GPS signals would be poor. However, by using the GPS repeater, the device within the indoor can take advantage of the amplified GPS signals.

However, in existing solutions, GPS repeaters are standalone units. Therefore, consumers that wish to amplify GPS signals and amplify cellular signals must purchase separate units.

Figure 2:
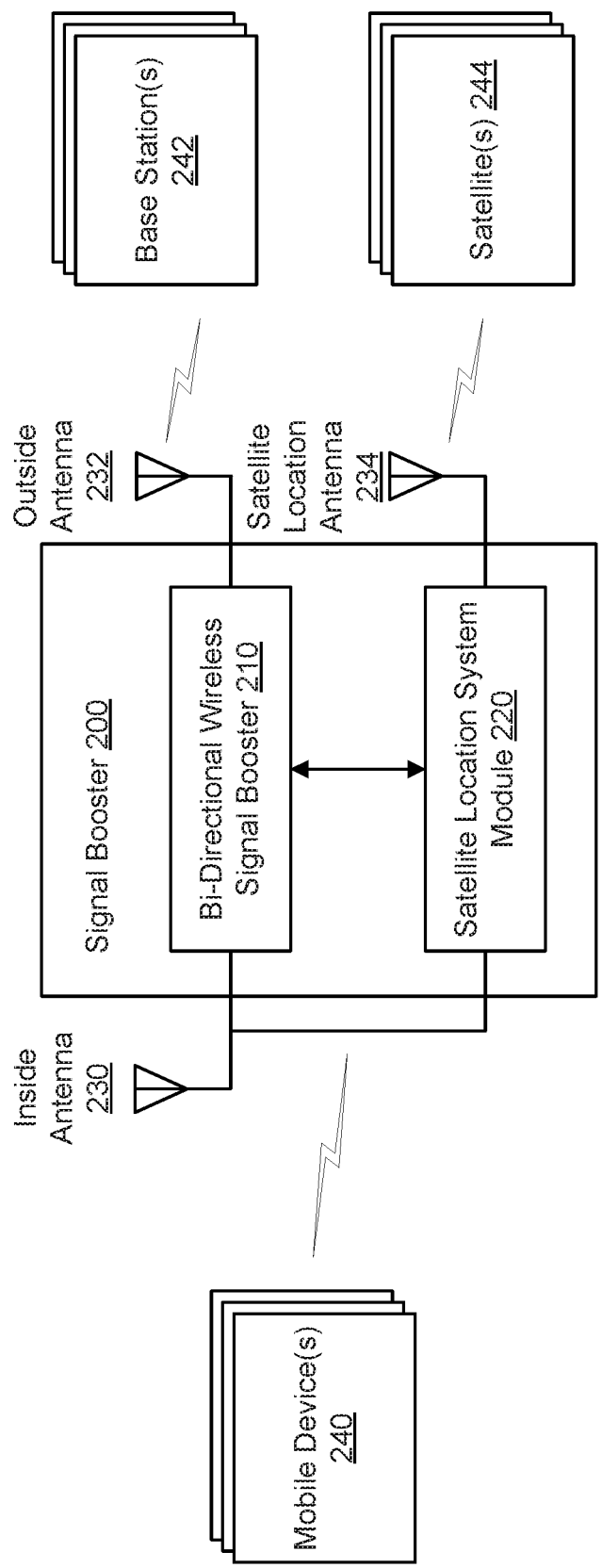
FIG. 2 illustrates a signal booster with a satellite location system signal rebroadcast functionality in accordance with an example.

FIG. 2 illustrates an exemplary signal booster 200 with a satellite location system signal rebroadcast functionality, such as a GPS signal rebroadcast functionality. The signal booster 200 can be an industrial signal booster or a consumer signal booster. The signal booster 200 can include a bi-directional wireless signal booster 210 operable to amplify cellular signals. Alternatively, the bi-directional wireless signal booster 210 can amplify non-cellular signals (e.g., signals can be amplified in band frequencies designated for public safety). In addition, the bi-directional wireless signal booster 210 can be coupled to a satellite location system module 220. Therefore, both the bi-directional wireless signal booster 210 and the satellite location system module 220 can be integrated in the signal booster 200. The signal booster 200 can function to amplify both cellular signals and satellite location system signals, such as GPS signals. In other words, the signal booster 200 can function to rebroadcast both amplified cellular signals and amplified satellite location system signals. The signal booster 200 can amplify the cellular signals in both a downlink and an uplink, and the signal booster 200 can amplify the satellite location system signals in a downlink.

In one configuration, the signal booster 200 can have a satellite location system module configured with a satellite location system signal rebroadcast functionality. The satellite location system signal can be a GPS signal. Alternatively, the satellite location system signal can be one of: a Global Navigation Satellite System (GLONASS) signal, a Galileo positioning system signal, a BeiDou Navigation Satellite System signal, a Navigation with Indian Constellation (NAVIC) signal or a Quasi-Zenith Satellite System (QZSS) signal. In one example, the satellite location system signal can be a global location satellite system signal or a regional location satellite system signal.

In a first configuration, the satellite location system module 220 can be coupled to a satellite location antenna 234, such as a GPS antenna. The satellite location antenna 234 can receive a satellite location system signal from one or more satellites 244, such as GPS satellites. In one example, the satellite location system module 220 can demodulate the satellite location system signal, or alternatively, the satellite location system signal can be demodulated using a separate module. The satellite location system module 220 can include a signal path that functions to amplify the satellite location system signal. For example, the signal path can include one or more amplifiers and/or band pass filters that function to amplify the satellite location system signal. Therefore, an unamplified satellite location system signal can be inputted to the satellite location system module 220, and the satellite location system module 220 can output the amplified satellite location system signal. The satellite location system module 220 can provide the amplified satellite location system signal to an inside antenna 230 of the signal booster 200. The inside antenna 230 can transmit the amplified satellite location system signal to a mobile device 240. The amplified satellite location system signal can be consumed by one or more applications executing on the mobile device 240.

In one example, the inside antenna 230 can be located at a selected transmission distance from the mobile device 240. As an example, the inside antenna 230 can be coupled to the mobile device 240, or the inside antenna 230 can be located within a few feet of the mobile device 240. In another example, the inside antenna 230 can be located several hundred feet from the mobile device 240. As an alternative, the bi-directional wireless signal booster 210 can include separate inside antennas for different signal amplification paths within the bi-directional wireless signal booster 210 (as opposed to a single inside antenna 230).

In a second configuration, the satellite location antenna 234 can receive a satellite location system signal via the satellite location antenna 234 from one or more satellites 244. In this configuration, rather than the satellite location system module 220 amplifying the satellite location system signal, the satellite location system module 220 can provide the satellite location system signal to the bi-directional wireless signal booster 210. The bi-directional wireless signal booster 210 can include a satellite location system signal path that functions to amplify and filter the satellite location system signal. This satellite location system signal path can be separate than cellular signal paths used by the bi-directional wireless signal booster 210 to amplify cellular signals. The satellite location system signal can be provided to the satellite location system signal path of the bi-directional wireless signal booster 210 to obtain an amplified satellite location system signal. The bi-directional wireless signal booster 210 can send the amplified satellite location system signal to the mobile device 240 via the inside antenna 230.

Therefore, in the first configuration, the satellite location system module 220 (coupled to the bi-directional wireless signal booster 210) can receive the satellite location system signal and amplify the satellite location system signal, and then transmit the amplified satellite location system signal to the mobile device 240 via the inside antenna 230. In the second configuration, the satellite location system module 220 can provide a received satellite location system signal to the bi-directional wireless signal booster 210, and the bi-directional wireless signal booster 210 can amplify the satellite location system signal, and then transmit the amplified satellite location system signal to the mobile device 240 via the inside antenna 230.

In a third configuration, the bi-directional wireless signal booster 210, the inside antenna 230, and an outside antenna 232 can be part of a first standalone unit, and the satellite location system module 220 and satellite location antenna 234 can be part of a second standalone unit. The first standalone unit and the second standalone unit can communicate wirelessly or through a wired connection. The satellite location system module 220 can receive the satellite location system signals from the satellites 244 via the satellite location antenna 234. The satellite location system module 220 can demodulate the satellite location system signals and send the satellite location system signals to the bi-directional wireless signal booster 210. The bi-directional wireless signal booster 210 can receive the satellite location system signals, amplify the satellite location system signals, and send amplified satellite location system signals to the mobile device 240. In this configuration, the first standalone unit (which includes the bi-directional wireless signal booster 210) can be responsible for amplifying the satellite location system signals for transmission to the mobile device 240. However, the first standalone unit may not be responsible for receiving the satellite location system signals from the satellites 244 and demodulating the satellite location system signals.

In one example, the bi-directional wireless signal booster 210 can receive cellular signals via the outside antenna 232 in a downlink from the base station 242. The cellular signals can be provided to a downlink cellular signal path to amplify and filter the cellular signals. Amplified cellular signals can be transmitted to the mobile device 240 via the inside antenna 230. In another example, the bi-directional wireless signal booster 210 can receive cellular signals via the inside antenna 230 in an uplink from the mobile device 240. The cellular signals can be provided to an uplink cellular signal path to amplify and filter the cellular signals. Amplified cellular signals can be transmitted to the base station 242 via the outside antenna 232.

As an alternative, the bi-directional wireless signal booster 210 can include separate outside antennas for different signal amplification paths within the bi-directional wireless signal booster 210 (as opposed to a single outside antenna 232). As another alternative, the outside antenna 232 and the satellite location antenna 234 can be combined to form a single outside antenna.

In an alternative configuration, the satellite location system module 220 can be a GPS module, a GLONASS module, a Galileo positioning system module, a BeiDou Navigation Satellite System module, a NAVIC module or a QZSS module. The satellite location antenna 234 can be a GPS antenna, a GLONASS antenna, a Galileo positioning system antenna, a BeiDou Navigation Satellite System antenna, a NAVIC antenna or a QZSS antenna. The satellites 244 can be GPS satellites, GLONASS satellites, Galileo positioning system satellites, BeiDou Navigation Satellite System satellites, NAVIC satellites or QZSS satellites.

Figure 3:
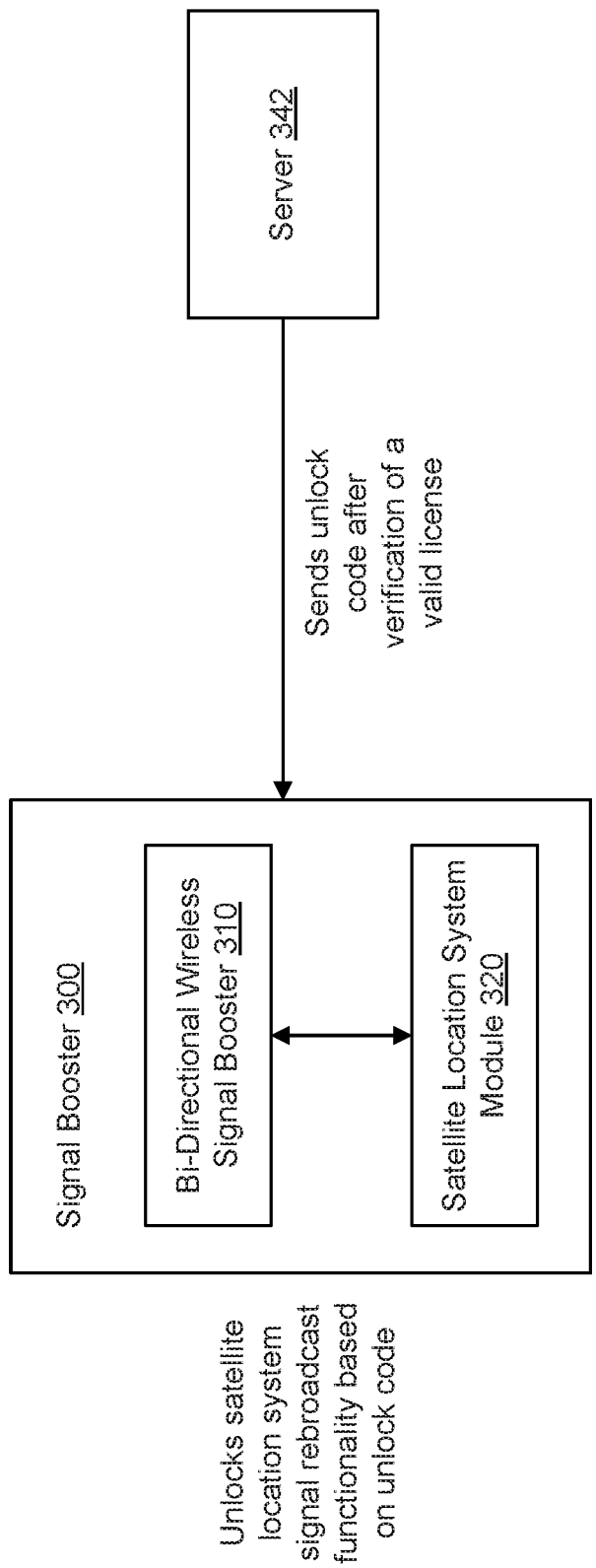
FIG. 3 illustrates a signal booster operable to unlock a satellite location system signal rebroadcast functionality using an unlock code in accordance with an example.

FIG. 3 illustrates an exemplary signal booster 300 operable to unlock a satellite location system signal rebroadcast functionality, such as a GPS signal rebroadcast functionality, using an unlock code. The satellite location system signal rebroadcast functionality can enable the signal booster 300 to amplify satellite location system signals, and then rebroadcast amplified satellite location system signals to a mobile device. The signal booster 300 can include a bi-directional wireless signal booster 310 integrated with a satellite location system module 320. The bi-directional wireless signal booster 310 integrated with the satellite location system module 320 can function to amplify both cellular signals and satellite location system signals for transmission to the mobile device.

In one configuration, when the signal booster 300 is purchased, access to the satellite location system signal rebroadcast functionality can be locked. The satellite location system signal rebroadcast functionality can be unlocked in order to obtain access to the satellite location system signal rebroadcast functionality. There can be several mechanisms to unlock the satellite location system signal rebroadcast functionality, as described below.

In one example, a user of the signal booster 300 can purchase a suitable license to gain access to the satellite location system signal rebroadcast functionality. For example, the user can purchase a Federal Communications Commission (FCC) license from an electronic marketplace. The user can obtain the license, and then provide the license directly to the signal booster 300. The signal booster 300 can verify the validity of the license. If the signal booster 300 determines that the license is valid, the signal booster 300 can unlock the satellite location system signal rebroadcast functionality. After the satellite location system signal rebroadcast functionality is unlocked, the signal booster 300 is able to amplify the satellite location system signals.

In another example, the user of the signal booster 300 can purchase a suitable license (e.g., through an electronic marketplace), and the license can be provided to a server 342. The server 342 can determine whether the license is valid. If the license is determined to be valid, the server 342 can identify an unlock code to unlock the satellite location system signal rebroadcast functionality of the signal booster 300. For example, the unlock code can be selected from a repository or generated using certain parameters. The server 342 can send the unlock code to the signal booster 300. After receiving the unlock code, the signal booster 300 can unlock the satellite location system signal rebroadcast functionality. Therefore, after the satellite location system signal rebroadcast functionality is enabled at the signal booster 300, the signal booster 300 is able to amplify the satellite location system signals.

In one example, the unlock code can expire after a predefined period of time (e.g., 3 months, 6 months, 1 year). After the unlock code expires, the satellite location system signal rebroadcast functionality can cease at the signal booster 300. In other words, the satellite location system signal rebroadcast functionality can automatically lock after the unlock code expires. However, the signal booster 300 can obtain a new license, and based on the new license, the signal booster 300 can receive a new unlock code from the server 342, which enables the signal booster 300 to preserve access to the satellite location system signal rebroadcast functionality.

Figure 4:
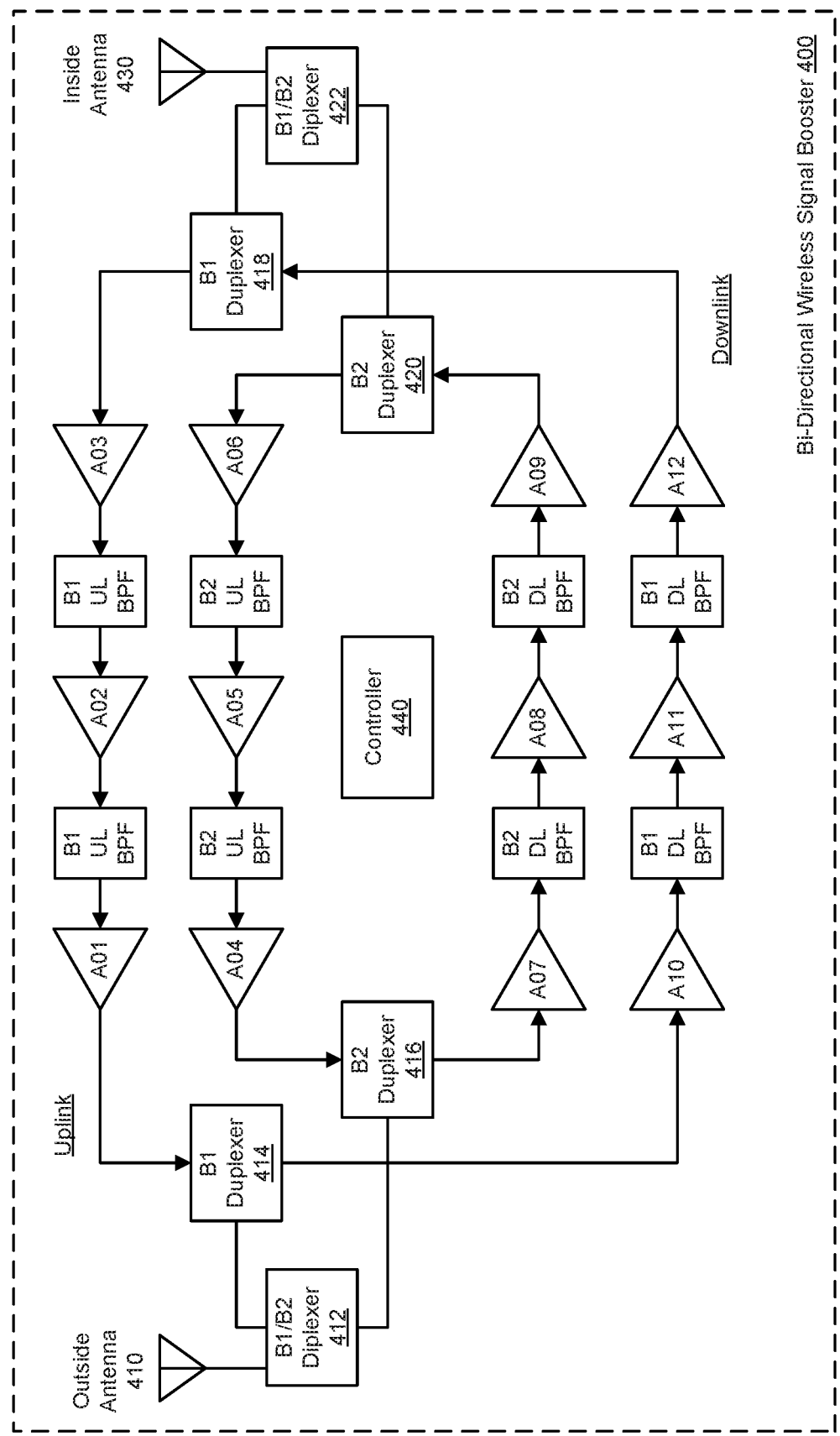
FIG. 4 illustrates a cellular signal booster configured to amplify uplink (UL) and downlink (DL) signals using one or more downlink signal paths and one or more uplink signal paths in accordance with an example.

FIG. 4 illustrates an exemplary bi-directional wireless signal booster 400 configured to amplify uplink (UL) and downlink (DL) signals using a separate signal path for each UL frequency band and DL frequency band and a controller 440. The bi-directional wireless signal booster 400 can be integrated with a satellite location system module (or a GPS module) in a signal booster. An outside antenna 410, or an integrated node antenna, can receive a downlink signal. For example, the downlink signal can be received from a base station (not shown). The downlink signal can be provided to a first B1/B2 diplexer 412, wherein B1 represents a first frequency band and B2 represents a second frequency band. The first B1/B2 diplexer 412 can create a B1 downlink signal path and a B2 downlink signal path. Therefore, a downlink signal that is associated with B1 can travel along the B1 downlink signal path to a first B1 duplexer 414, or a downlink signal that is associated with B2 can travel along the B2 downlink signal path to a first B2 duplexer 416. After passing the first B1 duplexer 414, the downlink signal can travel through a series of amplifiers (e.g., A10, A11 and A12) and downlink band pass filters (BPF) to a second B1 duplexer 418. Alternatively, after passing the first B2 duplexer 416, the downlink can travel through a series of amplifiers (e.g., A07, A08 and A09) and downlink band pass filters (BFF) to a second B2 duplexer 420. At this point, the downlink signal (B1 or B2) has been amplified and filtered in accordance with the type of amplifiers and BPFs included in the bi-directional wireless signal booster 400. The downlink signals from the second B1 duplexer 418 or the second B2 duplexer 420, respectively, can be provided to a second B1/B2 diplexer 422. The second B1/B2 diplexer 422 can provide an amplified downlink signal to an inside antenna 430, or an integrated device antenna. The inside antenna 430 can communicate the amplified downlink signal to a wireless device (not shown), such as a mobile phone.

In one example, the inside antenna 430 can receive an uplink (UL) signal from the wireless device. The uplink signal can be provided to the second B1/B2 diplexer 422. The second B1/B2 diplexer 422 can create a B1 uplink signal path and a B2 uplink signal path. Therefore, an uplink signal that is associated with B1 can travel along the B1 uplink signal path to the second B1 duplexer 418, or an uplink signal that is associated with B2 can travel along the B2 uplink signal path to the second B2 duplexer 422. After passing the second B1 duplexer 418, the uplink signal can travel through a series of amplifiers (e.g., A01, A02 and A03) and uplink band pass filters (BPF) to the first B1 duplexer 414. Alternatively, after passing the second B2 duplexer 420, the uplink signal can travel through a series of amplifiers (e.g., A04, A05 and A06) and uplink band pass filters (BPF) to the first B2 duplexer 416. At this point, the uplink signal (B1 or B2) has been amplified and filtered in accordance with the type of amplifiers and BFFs included in the bi-directional wireless signal booster 400. The uplink signals from the first B1 duplexer 14 or the first B2 duplexer 16, respectively, can be provided to the first B1/B2 diplexer 12. The first B1/B2 diplexer 12 can provide an amplified uplink signal to the outside antenna 10. The outside antenna can communicate the amplified uplink signal to the base station.

In one example, the bi-directional wireless signal booster 400 can be a 6-band booster. In other words, the bi-directional wireless signal booster 400 can perform amplification and filtering for downlink and uplink signals having a frequency in bands B1, B2, B3 B4, B5 and/or B6.

In one example, the bi-directional wireless signal booster 400 can use the duplexers to separate the uplink and downlink frequency bands, which are then amplified and filtered separately. A multiple-band cellular signal booster can typically have dedicated radio frequency (RF) amplifiers (gain blocks), RF detectors, variable RF attenuators and RF filters for each uplink and downlink band.

Figure 5:
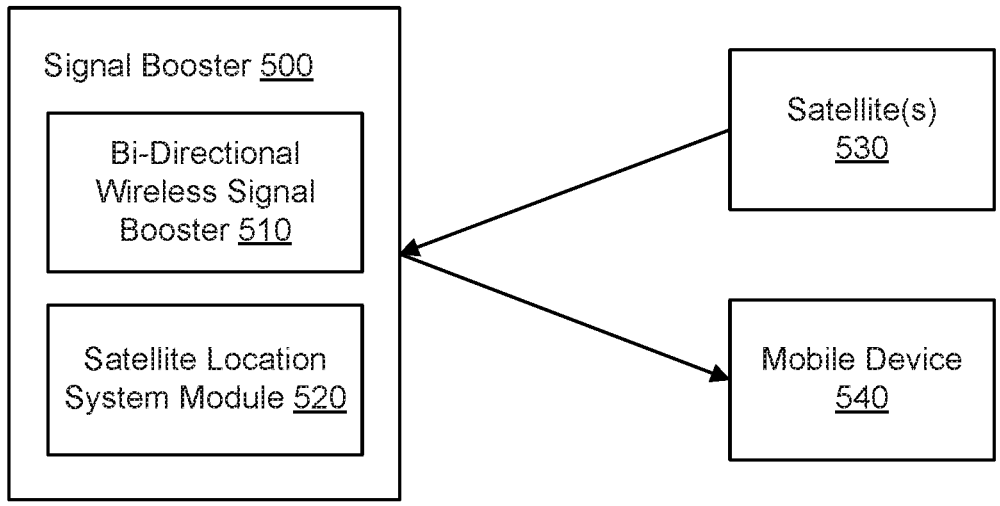
FIG. 5 illustrates a signal booster in accordance with an example.

FIG. 5 illustrates an exemplary signal booster 500. The signal booster 500 can include a bi-directional wireless signal booster 510 and a satellite location system module 520 integrated with the bi-directional wireless signal booster 510. The satellite location system module 520 can receive a satellite location system signal from one or more satellites 530. The bi-directional wireless signal booster 510 can amplify the satellite location system signal in at least one direction. The bi-directional wireless signal booster 510 can rebroadcast an amplified satellite location system signal to a mobile device 540 that is located within a defined distance from the signal booster 500.

Figure 6:
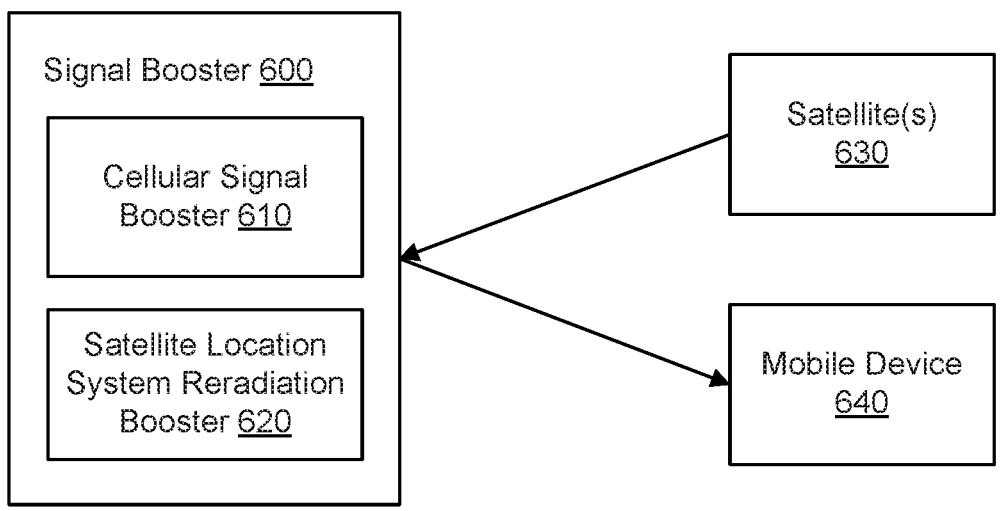
FIG. 6 illustrates a signal booster in accordance with an example.

FIG. 6 illustrates an exemplary signal booster 600. The signal booster 600 can include a cellular signal booster 610 and a satellite location system reradiation booster 620 integrated with the cellular signal booster 610. The cellular signal booster 610 can amplify and retransmit at least one of: downlink cellular signals or uplink cellular signals. The satellite location system reradiation booster 620 can receive satellite location system signals from one or more satellites 630. The satellite location system reradiation booster 620 can amplify the satellite location system signals and retransmit amplified satellite location system signals to a mobile device 640 located within a defined distance from the signal booster 600.

Figure 7:
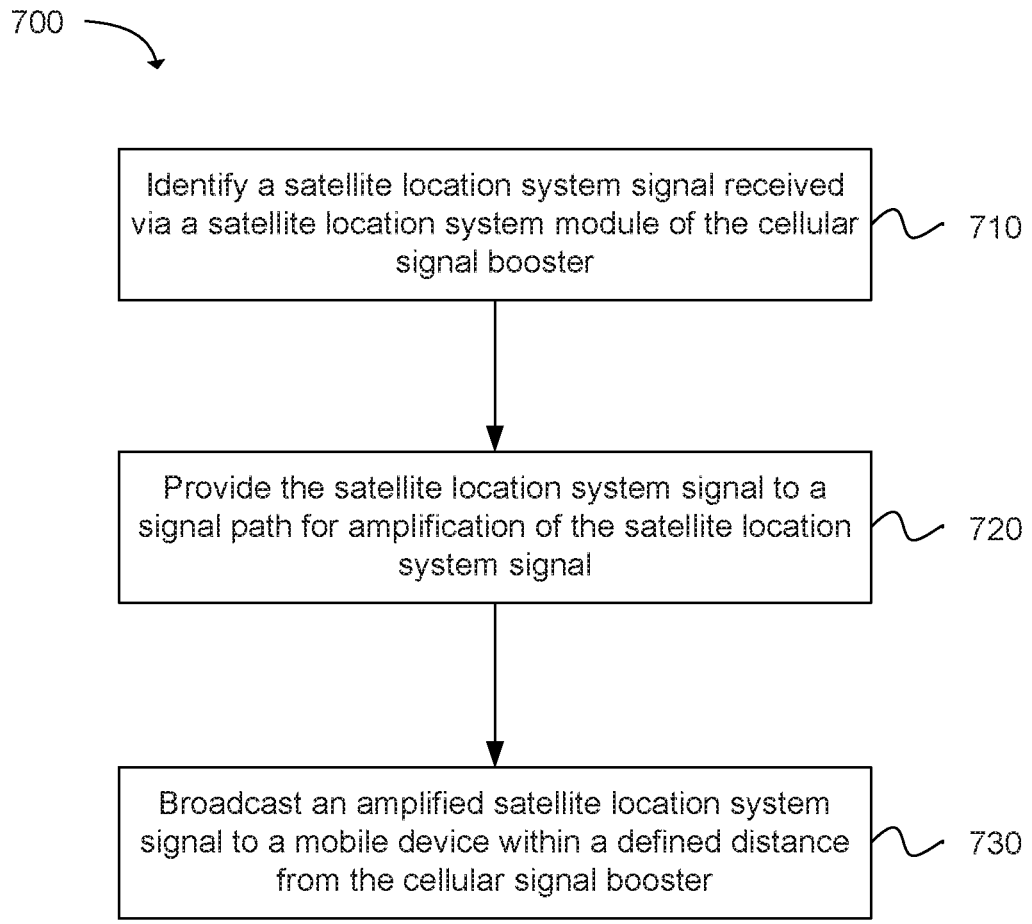
FIG. 7 illustrates functionality of a cellular signal booster with a satellite location system signal rebroadcast functionality in accordance with an example.

FIG. 7 illustrates functionality 700 of a cellular signal booster with a satellite location system signal rebroadcast functionality. The cellular signal booster can identify a satellite location system signal received via a satellite location system module of the cellular signal booster, as in block 710. The cellular signal booster can provide the satellite location system signal to a signal path for amplification of the satellite location system signal, as in block 720. The cellular signal booster can broadcast an amplified satellite location system signal to a mobile device within a defined distance from the cellular signal booster, as in block 730.

Figure 8:
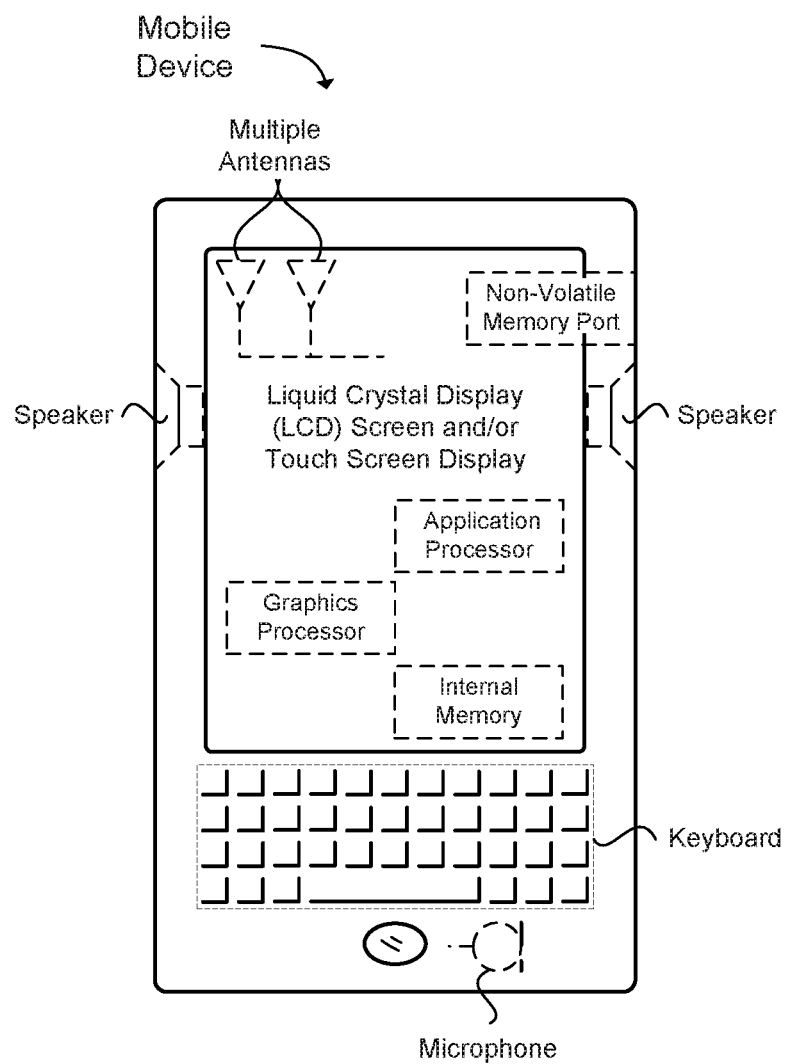
FIG. 8 illustrates a wireless device in accordance with an example.

FIG. 8 provides an example illustration of the wireless device, such as a user equipment (UE), a mobile station (MS), a mobile communication device, a tablet, a handset, a wireless transceiver coupled to a processor, or other type of wireless device. The wireless device can include one or more antennas configured to communicate with a node or transmission station, such as an access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 8 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be with the wireless device or wirelessly connected to the wireless device to provide additional user input. A virtual keyboard can also be provided using the touch screen.

Examples

The following examples pertain to specific technology embodiments and point out specific features, elements, or actions that can be used or otherwise combined in achieving such embodiments.

Example 1 includes a signal booster, comprising: a bi-directional wireless signal booster; and a satellite location system module integrated with the bi-directional wireless signal booster, wherein the satellite location system module is configured to: receive a satellite location system signal from one or more satellites; and the bi-directional wireless signal booster is configured to: amplify the satellite location system signal in at least one direction; and rebroadcast an amplified satellite location system signal to a mobile device that is located within a defined distance from the signal booster.

Example 2 includes the signal booster of Example 1, wherein: access to a satellite location system signal rebroadcast functionality is initially locked upon purchase of the signal booster; and the satellite location system signal rebroadcast functionality is unlocked upon verification that the signal booster possesses a valid license to access the satellite location system signal rebroadcast functionality.

Example 3 includes the signal booster of any of Examples 1 to 2, wherein the signal booster is configured to unlock the satellite location system signal rebroadcast functionality after receiving an unlock code from a server, wherein the server is configured to verify that an operator possesses a valid license and sends the unlock code to the signal booster to unlock the satellite location system signal rebroadcast functionality.

Example 4 includes the signal booster of any of Examples 1 to 3, wherein the signal booster is configured to unlock the satellite location system signal rebroadcast functionality using an unlock code, wherein the unlock code is configured to expire after a predefined period of time.

Example 5 includes the signal booster of any of Examples 1 to 4, wherein the bi-directional wireless signal booster is configured to: receive a downlink signal from a base station; direct the downlink signal to a selected signal path for filtering and amplification of the downlink signal, wherein the signal path is selected based on a band associated with the downlink signal; and transmit an amplified downlink signal to the mobile device.

Example 6 includes the signal booster of any of Examples 1 to 5, wherein the bi-directional wireless signal booster is configured to: receive an uplink signal from the mobile device; direct the uplink signal to a selected signal path for filtering and amplification of the uplink signal, wherein the signal path is selected based on a band associated with the uplink signal; and transmit an amplified uplink signal to a base station.

Example 7 includes the signal booster of any of Examples 1 to 6, wherein the bi-directional wireless signal booster is configured to boost signals in up to six bands.

Example 8 includes the signal booster of any of Examples 1 to 7, wherein the bi-directional wireless signal booster is configured to amplify signals in band frequencies designated for public safety.

Example 9 includes the signal booster of any of Examples 1 to 8, further comprising: an outside antenna configured to communicate signals with a base station; and an inside antenna configured to communicate signals to the mobile device, wherein the inside antenna is located at a selected distance from the mobile device.

Example 10 includes the signal booster of any of Examples 1 to 9, wherein the satellite location system signal is one of: a global positioning system (GPS) signal, a Global Navigation Satellite System (GLONASS) signal, a Galileo positioning system signal, a BeiDou Navigation Satellite System signal, a Navigation with Indian Constellation (NAVIC) signal or a Quasi-Zenith Satellite System (QZSS) signal.

Example 11 includes a signal booster, comprising: a cellular signal booster configured to amplify and retransmit at least one of: downlink cellular signals or uplink cellular signals; and a satellite location system reradiation booster integrated with the cellular signal booster, wherein the satellite location system reradiation booster is configured to: receive satellite location system signals from one or more satellites, amplify the satellite location system signals and retransmit amplified satellite location system signals to a mobile device located within a defined distance from the signal booster.

Example 12 includes the signal booster of Example 11, wherein: access to the satellite location system reradiation booster is initially locked upon purchase of the signal booster; and the satellite location system reradiation booster is unlocked upon verification that the signal booster possesses a valid license to access a satellite location system signal rebroadcast functionality of the satellite location system reradiation booster.

Example 13 includes the signal booster of any of Examples 11 to 12, wherein the signal booster is configured to unlock access to the satellite location system reradiation booster based on an unlock code received from a server, wherein the server is configured to verify that the signal booster possesses a valid license and sends the unlock code to the signal booster to unlock the satellite location system reradiation booster.

Example 14 includes the signal booster of any of Examples 11 to 13, wherein the unlock code is configured to expire after a predefined period of time and a new unlock code is obtained to preserve access to the satellite location system reradiation booster.

Example 15 includes the signal booster of any of Examples 11 to 14, wherein the cellular signal booster is configured to: receive a downlink cellular signal from a base station; direct the downlink cellular signal to a selected signal path for filtering and amplification of the downlink cellular signal, wherein the signal path is selected based on a band associated with the downlink cellular signal; and transmit an amplified downlink cellular signal to the mobile device.

Example 16 includes the signal booster of any of Examples 11 to 15, wherein the cellular signal booster is configured to: receive an uplink cellular signal from the mobile device; direct the uplink cellular signal to a selected signal path for filtering and amplification of the uplink cellular signal, wherein the signal path is selected based on a band associated with the uplink cellular signal; and transmit an amplified uplink cellular signal to a base station.

Example 17 includes a cellular signal booster with a satellite location system signal rebroadcast functionality, the cellular signal booster comprising one or more processors and memory configured to: identify a satellite location system signal received via a satellite location system module of the cellular signal booster; provide the satellite location system signal to a signal path for amplification of the satellite location system signal; and broadcast an amplified satellite location system signal to a mobile device within a defined distance from the cellular signal booster.

Example 18 includes the cellular signal booster of Example 17, wherein: access to the satellite location system signal rebroadcast functionality is initially locked upon purchase of the cellular signal booster; and the satellite location system signal rebroadcast functionality is unlocked upon verification that the cellular signal booster possesses a valid license to use the satellite location system signal rebroadcast functionality.

Example 19 includes the cellular signal booster of any of Examples 17 to 18, wherein: access to the satellite location system signal rebroadcast functionality is initially locked upon purchase of the cellular signal booster; and the satellite location system signal rebroadcast functionality is unlocked based on an unlock code received from a server, wherein the server is configured to verify that the signal booster possesses a valid license and sends the unlock code to the signal booster to unlock the satellite location system signal rebroadcast functionality.

Example 20 includes the cellular signal booster of any of Examples 17 to 19, wherein the unlock code is configured to expire after a predefined period of time and a new unlock code is obtained to preserve access to the satellite location system reradiation booster.

Example 21 includes the cellular signal booster of any of Examples 17 to 20, wherein the one or more processors and memory are further configured to: identify a cellular signal received at the cellular signal booster; provide the cellular signal to a selected signal path for amplification of the cellular signal; and transmit an amplified cellular signal to one of the mobile device or a base station.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits or multiple processors can be used to implement the functional units described in this specification. For example, a first hardware circuit or a first processor can be used to perform processing operations and a second hardware circuit or a second processor (e.g., a transceiver or a baseband processor) can be used to communicate with other entities. The first hardware circuit and the second hardware circuit can be incorporated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention.

The invention claimed is:

1. A signal booster, comprising:
a bi-directional wireless signal booster; and
a satellite location system module integrated with the bi-directional wireless signal booster, wherein the satellite location system module is configured to:
receive a satellite location system signal from one or more satellites; and
the bi-directional wireless signal booster is configured to:
amplify the satellite location system signal in at least one direction; and
rebroadcast an amplified satellite location system signal to a mobile device that is located within a defined distance from the signal booster.

2. The signal booster of claim 1, wherein:
access to a satellite location system signal rebroadcast functionality is initially locked upon purchase of the signal booster; and
the satellite location system signal rebroadcast functionality is unlocked upon verification that the signal booster possesses a valid license to access the satellite location system signal rebroadcast functionality.

3. The signal booster of claim 1, wherein the signal booster is configured to unlock the satellite location system signal rebroadcast functionality after receiving an unlock code from a server, wherein the server is configured to verify that an operator possesses a valid license and sends the unlock code to the signal booster to unlock the satellite location system signal rebroadcast functionality.

4. The signal booster of claim 1, wherein the signal booster is configured to unlock the satellite location system signal rebroadcast functionality using an unlock code, wherein the unlock code is configured to expire after a predefined period of time.

5. The signal booster of claim 1, wherein the bi-directional wireless signal booster is configured to:
receive a downlink signal from a base station;
direct the downlink signal to a selected signal path for filtering and amplification of the downlink signal, wherein the signal path is selected based on a band associated with the downlink signal; and
transmit an amplified downlink signal to the mobile device.

6. The signal booster of claim 1, wherein the bi-directional wireless signal booster is configured to:
receive an uplink signal from the mobile device;
direct the uplink signal to a selected signal path for filtering and amplification of the uplink signal, wherein the signal path is selected based on a band associated with the uplink signal; and
transmit an amplified uplink signal to a base station.

7. The signal booster of claim 1, wherein the bi-directional wireless signal booster is configured to boost signals in up to six bands.

8. The signal booster of claim 1, wherein the bi-directional wireless signal booster is configured to amplify signals in band frequencies designated for public safety.

9. The signal booster of claim 1, further comprising:
an outside antenna configured to communicate signals with a base station; and
an inside antenna configured to communicate signals to the mobile device, wherein the inside antenna is located at a selected distance from the mobile device.

10. The signal booster of claim 1, wherein the satellite location system signal is one of: a global positioning system (GPS) signal, a Global Navigation Satellite System (GLONASS) signal, a Galileo positioning system signal, a BeiDou Navigation Satellite System signal, a Navigation with Indian Constellation (NAVIC) signal or a Quasi-Zenith Satellite System (QZSS) signal.

11. A signal booster, comprising:
a cellular signal booster configured to amplify and retransmit at least one of:
downlink cellular signals or uplink cellular signals; and
a satellite location system reradiation booster integrated with the cellular signal booster, wherein the satellite location system reradiation booster is configured to:
receive satellite location system signals from one or more satellites, amplify the satellite location system signals and retransmit amplified satellite location system signals to a mobile device.

12. The signal booster of claim 11, wherein:
access to the satellite location system reradiation booster is initially locked upon purchase of the signal booster; and
the satellite location system reradiation booster is unlocked upon verification that the signal booster possesses a valid license to access a satellite location system signal rebroadcast functionality of the satellite location system reradiation booster.

13. The signal booster of claim 11, wherein the signal booster is configured to unlock access to the satellite location system reradiation booster based on an unlock code received from a server, wherein the server is configured to verify that the signal booster possesses a valid license and sends the unlock code to the signal booster to unlock the satellite location system reradiation booster.

14. The signal booster of claim 13, wherein the unlock code is configured to expire after a predefined period of time and a new unlock code is obtained to preserve access to the satellite location system reradiation booster.

15. The signal booster of claim 11, wherein the cellular signal booster is configured to:
receive a downlink cellular signal from a base station;
direct the downlink cellular signal to a selected signal path for filtering and amplification of the downlink cellular signal, wherein the signal path is selected based on a band associated with the downlink cellular signal; and
transmit an amplified downlink cellular signal to the mobile device.

16. The signal booster of claim 11, wherein the cellular signal booster is configured to:
receive an uplink cellular signal from the mobile device;
direct the uplink cellular signal to a selected signal path for filtering and amplification of the uplink cellular signal, wherein the signal path is selected based on a band associated with the uplink cellular signal; and
transmit an amplified uplink cellular signal to a base station.

17. A cellular signal booster with a satellite location system signal rebroadcast functionality, the cellular signal booster comprising one or more processors and memory configured to:
identify a satellite location system signal received via a satellite location system module of the cellular signal booster;
provide the satellite location system signal to a signal path for amplification of the satellite location system signal; and
broadcast an amplified satellite location system signal to a mobile device within a defined distance from the cellular signal booster.

18. The cellular signal booster of claim 17, wherein:
access to the satellite location system signal rebroadcast functionality is initially locked upon purchase of the cellular signal booster; and
the satellite location system signal rebroadcast functionality is unlocked upon verification that the cellular signal booster possesses a valid license to use the satellite location system signal rebroadcast functionality.

19. The cellular signal booster of claim 17, wherein:
access to the satellite location system signal rebroadcast functionality is initially locked upon purchase of the cellular signal booster; and
the satellite location system signal rebroadcast functionality is unlocked based on an unlock code received from a server, wherein the server is configured to verify that the signal booster possesses a valid license and sends the unlock code to the signal booster to unlock the satellite location system signal rebroadcast functionality.

20. The cellular signal booster of claim 19, wherein the unlock code is configured to expire after a predefined period of time and a new unlock code is obtained to preserve access to the satellite location system reradiation booster.

21. The cellular signal booster of claim 17, wherein the one or more processors and memory are further configured to:
identify a cellular signal received at the cellular signal booster;
provide the cellular signal to a selected signal path for amplification of the cellular signal; and
transmit an amplified cellular signal to one of the mobile device or a base station.

\* \* \* \* \*